(12) United States Patent
Tsai

(10) Patent No.: US 12,332,712 B2
(45) Date of Patent: Jun. 17, 2025

(54) METHOD OF UPDATING POWER FIRMWARE AND POWER SUPPLY

(71) Applicant: FSP TECHNOLOGY INC., Taoyuan (TW)

(72) Inventor: Chien-Li Tsai, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 21 days.

(21) Appl. No.: 18/338,257

(22) Filed: Jun. 20, 2023

(65) Prior Publication Data

US 2024/0019919 A1 Jan. 18, 2024

(30) Foreign Application Priority Data

Jul. 18, 2022 (TW) .................................. 111126875

(51) Int. Cl.
*G06F 1/3206* (2019.01)
*G06F 1/26* (2006.01)
*G06F 1/3203* (2019.01)
*G06F 8/65* (2018.01)

(52) U.S. Cl.
CPC .............. *G06F 1/3206* (2013.01); *G06F 1/26* (2013.01); *G06F 1/3203* (2013.01); *G06F 8/65* (2013.01)

(58) Field of Classification Search
CPC ........ G06F 1/26; G06F 1/3203; G06F 1/3206; G06F 8/65
See application file for complete search history.

(56) References Cited

U.S. PATENT DOCUMENTS

| | | | | |
|---|---|---|---|---|
| 7,421,573 | B2* | 9/2008 | Kim | G06F 8/65 713/1 |
| 7,730,295 | B1* | 6/2010 | Lee | G06F 9/4401 713/1 |
| 10,983,785 | B1* | 4/2021 | Bryan | G06F 8/65 |
| 2008/0086652 | A1* | 4/2008 | Krieger | G06F 8/65 713/330 |

* cited by examiner

*Primary Examiner* — Terrell S Johnson
(74) *Attorney, Agent, or Firm* — Muncy, Geissler, Olds & Lowe, P.C.

(57) ABSTRACT

A method of updating power firmware is applied to update power firmware when a power supply is powered. The method is executed by a microcontroller of the power supply, and the method includes steps of: planning a memory space in the microcontroller as a first space and a second space, wherein the first space stores a first program currently executing the power supply required by the power supply, emptying the second space before the power firmware is updated, writing a second program stored in a management system into the second space, switching the second space to the first space to complete updating the power firmware after the second program is completely written into the second space, and continuously outputting working power.

22 Claims, 3 Drawing Sheets

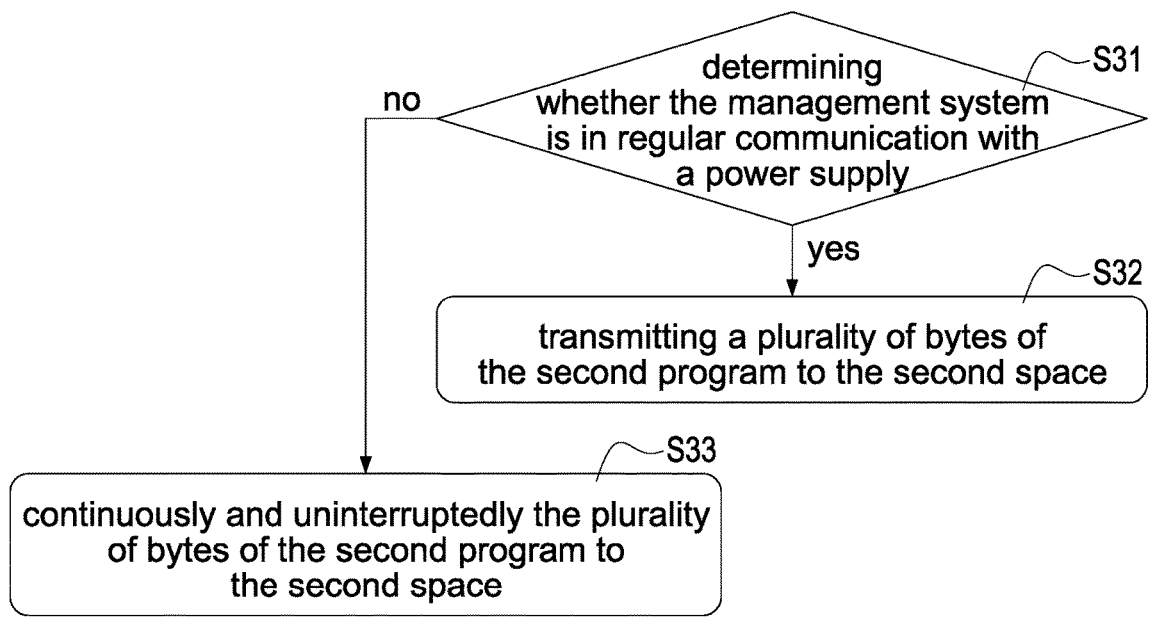

FIG.2

| regular communication | bytes of the second | regular communication | bytes of the second | regular communication | bytes of the second |
|---|---|---|---|---|---|
| reading voltage | program | reading current | program | reading power | program |

FIG.3

| regular communication | bytes of the second | bytes of the second | bytes of the second | bytes of the second | bytes of the second |
|---|---|---|---|---|---|
| reading power | program | program | program | program | program |

FIG.4

METHOD OF UPDATING POWER FIRMWARE AND POWER SUPPLY

BACKGROUND

Technical Field

The present disclosure relates to a method of updating power firmware and a power supply, and more particularly to a method of updating power firmware and a power supply without restarting and rebooting the system.

Description of Related Art

The statements in this section merely provide background information related to the present disclosure and do not necessarily constitute prior art.

The method of online updating power firmware is often used in the field of notebook computers, mobile phones, or power supplies. Compared with the updating of power firmware of notebook computers and mobile phones, since the power supply needs to continuously supply power to the load, when the power firmware is completely updated, it is not allowed to restart and reboot the system. In other words, it will have a great impact on the operation of the entire system once the power firmware is updated and then the system is restarted and rebooted.

SUMMARY

An objective of the present disclosure is to provide a method of updating power firmware to solve the problems of existing technology.

In order to achieve the above-mentioned objective, the method of updating power firmware is applied to update power firmware when a power supply is powered. The method is executed by a microcontroller of the power supply, and the method includes steps of: a planning step: planning a memory space in the microcontroller as a first space and a second space, wherein the first space stores a first program currently executing the power supply required by the power supply; an emptying step: emptying the second space before the power firmware is updated; a writing step: writing a second program stored in a management system into the second space; a switching step: switching the second space to the first space to complete updating the power firmware after the second program is completely written into the second space; and a supplying step: continuously outputting working power.

In one embodiment, in the writing step, when the management system continuously executes a regular communication with the power supply, a plurality of bytes of the second program are transmitted to the second space in batches.

In one embodiment, commands of the regular communication and the plurality of bytes of the second program are interleavedly transmitted.

In one embodiment, when transmission of the commands of the regular communication is idle, the plurality of bytes of the second program are transmitted to the second space.

In one embodiment, in the writing step, when the management system stops a regular communication with the power supply, a plurality of bytes of the second program are continuously transmitted to the second space.

In one embodiment, in the switching step, a start location of the second space is addressed as a start location of the first space.

In one embodiment, a size of the second space is equal to a size of the first space.

In one embodiment, in the switching step, after executing the first program stored in the first space for the last time, switching the second space to the first space.

In one embodiment, the management system executes a regular communication with the first space and the second space through an integrated circuit bus.

In one embodiment, in the switching step, checking the transmission integrity of a plurality of bytes of the second program through an error detection mechanism.

In one embodiment, the error detection mechanism comprises checksums, Hamming codes, hash functions, modulus algorithm, or parity checking.

Accordingly, the method of updating power firmware is used to realize the advantage of updating power firmware without restarting and rebooting the system.

Another objective of the present disclosure is to provide a power supply to solve the problems of existing technology.

In order to achieve the above-mentioned objective, the power supply is applied to update power firmware when the power supply is powered. The power supply includes a microcontroller and a power-supplying module. The microcontroller includes a communication unit, a memory unit, and an operation unit. The communication unit executes a regular communication with a management system. The memory unit includes a first space and a second space, and the first space stores a first program. The operation unit executes the first program, empties the second space before the power firmware is updated, and writes a second program stored in the management system into the second space. When the second program is completely written into the second space, the operation unit switches the second space to the first space to complete updating the power firmware. The power-supplying module is connected to the microcontroller, and the power-supplying continuously outputs working power according to the first program or the second program stored in the first space. In one embodiment, when the management system continuously executes the regular communication with the communication unit, a plurality of bytes of the second program are transmitted to the second space in batches.

In one embodiment, commands of the regular communication and the plurality of bytes of the second program are interleavedly transmitted.

In one embodiment, when transmission of the commands of the regular communication is idle, the plurality of bytes of the second program are transmitted to the second space.

In one embodiment, when the management system stops the regular communication with the communication unit, the plurality of bytes of the second program are continuously transmitted to the second space.

In one embodiment, the operation unit addresses a start location of the second space as a start location of the first space.

In one embodiment, a size of the second space is equal to a size of the first space.

In one embodiment, the operation unit switches the second space to the first space after executing the first program stored in the first space for the last time.

In one embodiment, the management system executes the regular communication with the first space and the second space through an integrated circuit bus.

In one embodiment, the communication unit checks the transmission integrity of a plurality of bytes of the second program through an error detection mechanism.

In one embodiment, the error detection mechanism comprises checksums, Hamming codes, hash functions, modulus algorithm, or parity checking.

Accordingly, the power supply is used to realize the advantage of updating power firmware without restarting and rebooting the system.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows:

FIG. 2 is a flowchart of a writing step in the method of updating power firmware according to the present disclosure.

FIG. 3 is a schematic diagram of interleavedly transmitting commands and a plurality of bytes to a second space during regular communication according to the present disclosure.

FIG. 4 is a schematic diagram of continuously transmitting the plurality of bytes to the second space when regular communication stops according to the present disclosure.

DETAILED DESCRIPTION

Figure 1:
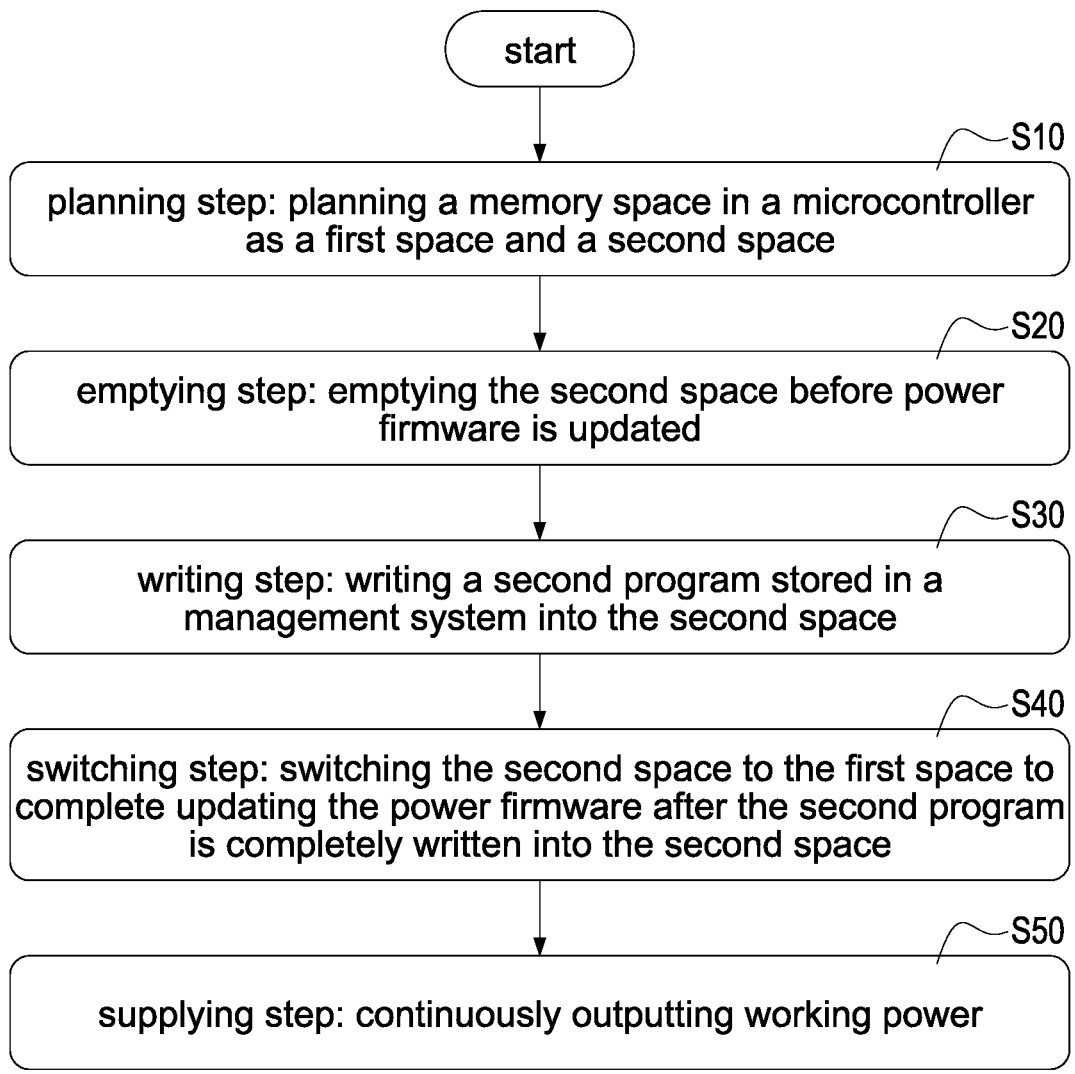
FIG. 1 is a flowchart of a method of updating power firmware according to the present disclosure.

Reference will now be made to the drawing figures to describe the present disclosure in detail. It will be understood that the drawing figures and exemplified embodiments of present disclosure are not limited to the details thereof.

Figure 5:
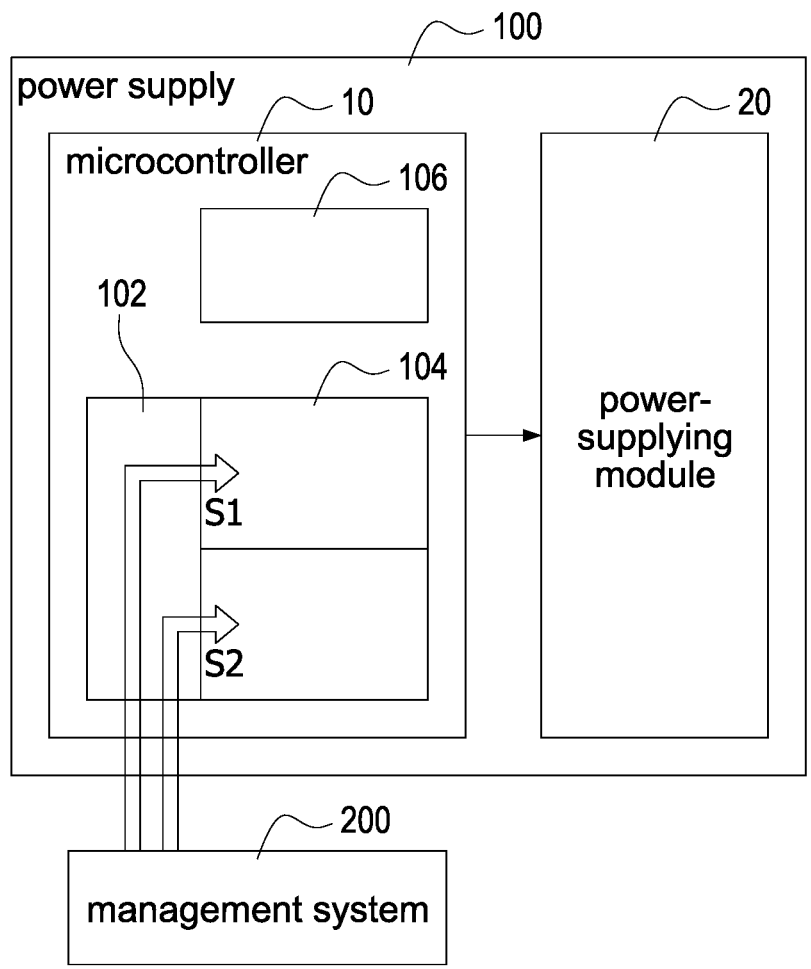
FIG. 5 is a schematic block diagram of operations between a power supply and a management system according to the present disclosure.

Please refer to FIG. 1, which shows a flowchart of a method of updating power firmware according to the present disclosure. The method of updating power firmware is applied to update power firmware when a power supply 100 is powered. Please refer to FIG. 5, which shows a schematic block diagram of operations between the power supply 100 and the management system 200 according to the present disclosure. The power supply 100 shown in FIG. 5 is applied to update power firmware when the power supply 100 is powered. The power supply 100 includes a microcontroller 10 and a power-supplying module 20. In particular, the aforementioned "to update power firmware when the power supply 100 is powered" means that the power supply will continue to supply normal working power no matter before, during, or after the power firmware is updated.

The microcontroller 10 includes a communication unit 102, a memory unit 104, and an operation unit 106. The communication unit 102 has wireless and/or wired communication functions, and is used to execute a regular communication with the management system 200. In the present disclosure, the regular communication refers to, for example, but not limited to, the operations of continuously communicating information such as voltage, current, power, etc. of a power source.

The memory unit 104 may be a digital signal process (DSP) or a microcontroller (MCU), and for its memory planning, the program inside is mainly divided into two parts: one part is bootloader code, which is the underlying program, and this part cannot be updated; the other part is the firmware that actually runs, which is the user application, and this part is based on the bootloader code and can be updated. The memory unit 104 has a first space S1 and a second space S2, and the first space S1 is used to store a first program P1.

A corresponding planning step of the method of updating power firmware is: planning a memory space (corresponding to the memory unit 104) in the microcontroller 10 as a first space S1 and a second space S2 (S10). In particular, the first space S1 stores the first program P1 currently executing the power supply required by the power supply 100. In one embodiment, a size of the second space S2 is, for example, but not limited to, equal to a size of the first space S1.

The operation unit 106 is used to execute the first program P1, and the operation unit 106 empties the second space S2 before the power firmware is updated. A corresponding emptying step of the method of updating power firmware is: emptying the second space S2 before the power firmware is updated (S20).

The operation unit 106 writes a second program P2 stored in the management system 200 into the second space S2. A corresponding writing step of the method of updating power firmware is: writing a second program P2 stored in the management system 200 into the second space S2 (S30).

After the operation unit 106 completely writes the second program P2 into the second space S2, the operation unit 106 switches the second space S2 to the first space S1 to complete updating the power firmware. A corresponding switching step of the method of updating power firmware is: switching the second space S2 to the first space S1 to complete updating the power firmware after the second program P2 is completely written into the second space S2 (S40).

The power-supplying module 20 is connected to the microcontroller 10. The power-supplying module 20 continuously outputs working power according to the first program P1 or the second program P2 stored in the first space S1. A corresponding supplying step of the method of updating power firmware is: continuously outputting working power (S50). In particular, the aforementioned "continuously outputs working power" means that no matter before, during, or after the power firmware is updated, the power-supplying module 20 continues to operate, and the power supply 100 does not need to be restarted or rebooted. In other words, the power supply 100 can continue to supply power normally, and can continue to perform updating the power firmware in next time.

Please refer to FIG. 2, which shows a flowchart of a writing step in the method of updating power firmware according to the present disclosure. In the writing step (S30), that is the method of writing the second program P2 stored in the management system 200 into the second space S2 is related to whether the management system 200 is in regular communication with the power supply 100. Specifically, in step (S31), determining whether the management system 200 is in regular communication with the power supply 100. When the determination result of step (S31) is "YES", that is, when the management system 200 is continuously in regular communication with the power supply 100, a plurality of bytes of the second program P2 are transmitted to the second space S2 in batches (S32).

Corresponding to the determination result of "YES" in step (S31), that is, when the management system 200 is continuously in regular communication with the power supply 100, for example, information such as voltage, current, power, etc. of a power source is continuously communicated, and therefore it indicates that the communication between the management system 200 and the first program P1 (which is the program required to execute the power supply of the power supply 100) cannot be interrupted. In one embodiment, commands of the regular communication and the plurality of bytes of the second program P2 (which is the program stored in the management system 200) are interleavedly transmitted. Please refer to FIG. 3, which shows a schematic diagram of interleavedly transmitting commands and a plurality of bytes to a second space during regular communication according to the present disclosure. In this condition, the management system 200 still communicates through a communication bus, such as but not limited to, integrated circuit bus (I2C) communication, to start the bootloader code function of the power supply 100 and communicate with the second program P2. That is, the management system 200 communicates with the first space S1 and the second space S2 through the integrated circuit bus (I2C).

At this time, the firmware update will change to the segment update method, that is, if the first program P1 is communicating, the system will receive that the second program P2 is busy and will be executed on the next serial clock. On the contrary, if the second program P2 is writing data, the system will receive that the first program P1 is busy and will wait until the next serial clock to respond the information.

Take FIG. 3 as an example, when the management system 200 continuously executes the regular communication with the power supply 100, the plurality of bytes of the second program P2 are transmitted to the second space S2 in batches. In particular, commands (such as a command of reading voltage, a command of reading current, a command of reading power, etc.) of the regular communication and the plurality of bytes of the second program P2 are interleavedly transmitted. Therefore, when the command of reading voltage is transmitted, the bytes of the second program P2 will be executed at the next serial clock. When the plurality of bytes of the second program P2 are executed, if the regular communication of the command of reading current is required, the command of reading current is changed, and the subsequent byte of the second program P2 will be executed at the next serial clock. Similarly, when the plurality of bytes of the second program P2 are executed, if the regular communication of the command of reading power is required, the command of reading power is changed, and the subsequent byte of the second program P2 will be executed at the next serial clock. Therefore, the commands of the regular communication and the plurality of bytes of the second program P2 are interleavedly transmitted until the plurality of bytes of the second program P2 are completely written into the second space S2, and then the second space S2 is switched to the first space S1 to complete updating the power firmware.

In particular, in the switching step, a start location of the second space S2 is addressed as a start location of the first space S1 to complete the switching from the second space S2 to the first space S1. In order to completely switch the information of the original first space S1 to the second space S2, after the first program P1 stored in the first space S1 is executed for the last time, the second space S2 will be switched to the first space S1. In particular, when transmission of the commands of the regular communication is idle, the plurality of bytes of the second program P2 are transmitted to the second space S2.

On the contrary, when the determination result of step (S31) is "NO", that is, when the management system 200 stops the regular communication with the power supply 100, the plurality of bytes of the second program P2 are continuously transmitted to the second space S2 (S33). Corresponding to the determination result of "NO" in step (S31), that is, when the management system 200 stops the regular communication with the power supply 100, the plurality of bytes of the second program P2 are continuously transmitted to the second space S2. Take FIG. 4 as an example, when the command (that is, the command of reading power) of the regular communication ends, that is the regular communication between the management system 200 and the power supply 100 is stopped, the plurality of bytes of the second program P2 are continuously and uninterruptedly transmitted to second space S2. Until the plurality of bytes of the second program P2 are completely written into the second space S2, the second space S2 is switched to the first space S1 to complete updating the power firmware.

Incidentally, in the switching step, in order to ensure the sequence and integrity of data transmission, an error detection mechanism is provided to check the transmission integrity of the plurality of bytes of the second program P2. In one embodiment, the error detection mechanism includes checksums, Hamming codes, hash functions, modulus algorithm, or parity checking. The error detection operation (behavior) at this time will not affect other functions of the power supply, and the power supply still keeps the first program P1 running without any influence.

Accordingly, the power supply is used to realize the advantage of updating power firmware without restarting and rebooting the system.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A method of updating power firmware applied to update power firmware when a power supply is powered, wherein the method is executed by a microcontroller of the power supply, the method comprising steps of:
   a planning step: planning a memory space in the microcontroller as a first space and a second space, wherein the first space stores a first program currently executing the power supply required by the power supply, wherein the first program is not a bootloader code cannot be updated,
   an emptying step: emptying the second space before the power firmware is updated,
   a writing step: writing a second program stored in a management system into the second space,
   a switching step: switching the second space to the first space to complete updating the power firmware after the second program is completely written into the second space, and
   a supplying step: continuously outputting working power.

2. The method of updating power firmware as claimed in claim 1, wherein in the writing step, when the management system continuously executes a regular communication with the power supply, a plurality of bytes of the second program are transmitted to the second space in batches.

3. The method of updating power firmware as claimed in claim 2, wherein commands of the regular communication and the plurality of bytes of the second program are interleavedly transmitted.

4. The method of updating power firmware as claimed in claim 3, wherein when transmission of the commands of the regular communication is idle, the plurality of bytes of the second program are transmitted to the second space.

5. The method of updating power firmware as claimed in claim 1, wherein in the writing step, when the management system stops a regular communication with the power supply, a plurality of bytes of the second program are continuously transmitted to the second space.

6. The method of updating power firmware as claimed in claim 1, wherein in the switching step, a start location of the second space is addressed as a start location of the first space.

7. The method of updating power firmware as claimed in claim 1, wherein a size of the second space is equal to a size of the first space.

8. The method of updating power firmware as claimed in claim 1, wherein in the switching step, after executing the first program stored in the first space for the last time, switching the second space to the first space.

9. The method of updating power firmware as claimed in claim 1, wherein the management system executes a regular communication with the first space and the second space through an integrated circuit bus.

10. The method of updating power firmware as claimed in claim 1, wherein in the switching step, checking the transmission integrity of a plurality of bytes of the second program through an error detection mechanism.

11. The method of updating power firmware as claimed in claim 10, wherein the error detection mechanism comprises checksums, Hamming codes, hash functions, modulus algorithm, or parity checking.

12. A power supply applied to update power firmware when the power supply is powered, the power supply comprising:
  a microcontroller, comprising:
    a communication unit, configured to execute a regular communication with a management system,
    a memory unit, comprising a first space and a second space, the first space configured to store a first program, wherein the first program is not a bootloader code cannot be updated, and
    an operation unit, configured to execute the first program, empty the second space before the power firmware is updated, and write a second program stored in the management system into the second space; after the second program is completely written into the second space, the operation unit switches the second space to the first space to complete updating the power firmware, and
  a power-supplying module, connected to the microcontroller, and the power-supplying configured to continuously output working power according to the first program or the second program stored in the first space.

13. The power supply as claimed in claim 12, wherein when the management system continuously executes the regular communication with the communication unit, a plurality of bytes of the second program are transmitted to the second space in batches.

14. The power supply as claimed in claim 13, wherein commands of the regular communication and the plurality of bytes of the second program are interleavedly transmitted.

15. The power supply as claimed in claim 14, wherein when transmission of the commands of the regular communication is idle, the plurality of bytes of the second program are transmitted to the second space.

16. The power supply as claimed in claim 12, wherein when the management system stops the regular communication with the communication unit, the plurality of bytes of the second program are continuously transmitted to the second space.

17. The power supply as claimed in claim 12, wherein the operation unit addresses a start location of the second space as a start location of the first space.

18. The power supply as claimed in claim 12, wherein a size of the second space is equal to a size of the first space.

19. The power supply as claimed in claim 12, wherein the operation unit switches the second space to the first space after executing the first program stored in the first space for the last time.

20. The power supply as claimed in claim 12, wherein the management system executes the regular communication with the first space and the second space through an integrated circuit bus.

21. The power supply as claimed in claim 12, wherein the communication unit checks the transmission integrity of a plurality of bytes of the second program through an error detection mechanism.

22. The power supply as claimed in claim 21, wherein the error detection mechanism comprises checksums, Hamming codes, hash functions, modulus algorithm, or parity checking.

* * * * *